US008799502B2

(12) United States Patent
Raphel et al.

(10) Patent No.: US 8,799,502 B2
(45) Date of Patent: *Aug. 5, 2014

(54) SYSTEMS AND METHODS FOR CONTROLLING THE NUMBER OF CONNECTIONS ESTABLISHED WITH A SERVER

(75) Inventors: Jose Kolencheril Raphel, San Jose, CA (US); Kailash Kailash, San Jose, CA (US); Michel K. Susai, San Jose, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1435 days.

This patent is subject to a terminal disclaimer.

(21) Appl. No.: 11/554,933

(22) Filed: Oct. 31, 2006

(65) Prior Publication Data

US 2007/0088826 A1    Apr. 19, 2007

Related U.S. Application Data

(62) Division of application No. 09/912,401, filed on Jul. 26, 2001.

(51) Int. Cl.
  *G06F 15/16*  (2006.01)
  *G06F 15/177*  (2006.01)
  *H04J 3/16*  (2006.01)
  *H04J 3/22*  (2006.01)

(52) U.S. Cl.
  USPC ........... 709/232; 709/220; 709/227; 709/228; 370/469

(58) Field of Classification Search
  None
  See application file for complete search history.

(56) References Cited

U.S. PATENT DOCUMENTS

| 5,249,290 | A |   | 9/1993 | Heizer |
|---|---|---|---|---|
| 5,440,719 | A |   | 8/1995 | Hanes et al. |
| 5,459,837 | A |   | 10/1995 | Caccavale |
| 5,491,808 | A |   | 2/1996 | Geist, Jr. |
| 5,511,208 | A |   | 4/1996 | Boyles et al. |
| 5,553,242 | A | * | 9/1996 | Russell et al. ............... 709/227 |

(Continued)

FOREIGN PATENT DOCUMENTS

| AU | 9079601 A | 3/2002 |
|---|---|---|
| WO | WO/98/06033 A1 | 12/1998 |

(Continued)

OTHER PUBLICATIONS

International Search Report Issued Dec. 30, 2002 for Application No. PCT/US02/23100, International Search Authority, 5 pages.

(Continued)

*Primary Examiner* — Azizul Choudhury
(74) *Attorney, Agent, or Firm* — Foley & Lardner LLP; Christopher J. McKenna; Daniel E. Rose

(57) ABSTRACT

A method for maximizing server throughput while avoiding overload of a server is presented. The method involves intercepting, via an interface unit, a client request for information from the server. Next, the interface unit determines the current server performance, where the server performance is based on the number of connections opened to the server, the response time of the server and the rate at which the response time is changing. Finally, the interface unit forwards the client request to the server if the current server performance is close to an optimal performance, whereby avoiding overload of the server.

18 Claims, 10 Drawing Sheets

(56) References Cited

U.S. PATENT DOCUMENTS

| | | | |
|---|---|---|---|
| 5,758,085 A | 5/1998 | Kouoheris et al. | |
| 5,764,915 A | 6/1998 | Heimsoth et al. | |
| 5,774,660 A | 6/1998 | Brendel et al. | |
| 5,774,668 A | 6/1998 | Choquier et al. | |
| 5,774,670 A | 6/1998 | Montulli et al. | |
| 5,787,470 A | 7/1998 | DeSimone et al. | |
| 5,809,235 A | 9/1998 | Sharma et al. | |
| 5,812,780 A | 9/1998 | Chen et al. | |
| 5,819,020 A | 10/1998 | Beeler, Jr. | |
| 5,835,724 A | 11/1998 | Smith et al. | |
| 5,852,717 A | 12/1998 | Bhide et al. | |
| 5,867,494 A | 2/1999 | Krishnaswamy et al. | |
| 5,881,229 A | 3/1999 | Singh et al. | |
| 5,918,013 A | 6/1999 | Mighdoll et al. | |
| 5,938,733 A | 8/1999 | Heimsoth et al. | |
| 5,941,988 A | 8/1999 | Bhagwat et al. | |
| 5,951,694 A | 9/1999 | Choquier et al. | |
| 5,983,268 A | 11/1999 | Freivald et al. | |
| 5,999,525 A | 12/1999 | Krishnaswamy et al. | |
| 6,006,269 A | 12/1999 | Phaal | |
| 6,023,722 A | 2/2000 | Colyer et al. | |
| 6,038,601 A | 3/2000 | Lambert et al. | |
| 6,041,352 A | 3/2000 | Burdick et al. | |
| 6,055,564 A | 4/2000 | Phaal et al. | |
| 6,091,733 A | 7/2000 | Takagi et al. | |
| 6,101,543 A | 8/2000 | Alden et al. | |
| 6,104,717 A * | 8/2000 | Coile et al. | 370/401 |
| 6,105,067 A * | 8/2000 | Batra | 709/227 |
| 6,141,699 A | 10/2000 | Luzzi et al. | |
| 6,161,902 A | 12/2000 | Lieberman | |
| 6,173,322 B1 * | 1/2001 | Hu | 709/224 |
| 6,189,033 B1 | 2/2001 | Jin et al. | |
| 6,226,684 B1 | 5/2001 | Sung et al. | |
| 6,259,705 B1 | 7/2001 | Takahashi et al. | |
| 6,272,148 B1 | 8/2001 | Takagi et al. | |
| 6,314,465 B1 | 11/2001 | Paul et al. | |
| 6,324,581 B1 * | 11/2001 | Xu et al. | 709/229 |
| 6,335,927 B1 | 1/2002 | Elliott et al. | |
| 6,360,270 B1 * | 3/2002 | Cherkasova et al. | 709/229 |
| 6,389,462 B1 | 5/2002 | Cohen et al. | |
| 6,405,252 B1 | 6/2002 | Gupta et al. | |
| 6,411,986 B1 | 6/2002 | Susai et al. | |
| 6,434,513 B1 | 8/2002 | Sherman et al. | |
| 6,438,597 B1 | 8/2002 | Mosberger et al. | |
| 6,446,028 B1 | 9/2002 | Wang | |
| 6,502,102 B1 | 12/2002 | Haswell et al. | |
| 6,523,027 B1 | 2/2003 | Underwood | |
| 6,578,066 B1 | 6/2003 | Logan et al. | |
| 6,587,878 B1 | 7/2003 | Merriam | |
| 6,601,233 B1 | 7/2003 | Underwood | |
| 6,606,661 B1 | 8/2003 | Agrawal et al. | |
| 6,609,128 B1 | 8/2003 | Underwood | |
| 6,633,878 B1 | 10/2003 | Underwood | |
| 6,665,872 B1 * | 12/2003 | Krishnamurthy et al. | 725/95 |
| 6,668,276 B1 * | 12/2003 | Ohkado et al. | 709/217 |
| 6,697,849 B1 | 2/2004 | Carlson | |
| 6,700,902 B1 | 3/2004 | Meyer | |
| 6,701,514 B1 | 3/2004 | Haswell et al. | |
| 6,704,873 B1 | 3/2004 | Underwood | |
| 6,718,535 B1 | 4/2004 | Underwood | |
| 6,721,686 B2 | 4/2004 | Malmskog et al. | |
| 6,725,272 B1 * | 4/2004 | Susai et al. | 709/229 |
| 6,731,625 B1 | 5/2004 | Eastep et al. | |
| 6,738,933 B2 | 5/2004 | Fraenkel et al. | |
| 6,754,181 B1 | 6/2004 | Elliott et al. | |
| 6,760,775 B1 | 7/2004 | Anerousis et al. | |
| 6,772,202 B2 | 8/2004 | Wright | |
| 6,816,904 B1 | 11/2004 | Ludwig et al. | |
| 6,823,374 B2 | 11/2004 | Kausik et al. | |
| 6,836,785 B1 | 12/2004 | Bakshi et al. | |
| 6,907,546 B1 | 6/2005 | Haswell et al. | |
| 6,909,708 B1 | 6/2005 | Krishnaswamy et al. | |
| 6,917,971 B1 | 7/2005 | Klein | |
| 6,918,113 B2 | 7/2005 | Patel et al. | |
| 6,959,320 B2 | 10/2005 | Shah et al. | |
| 7,000,012 B2 | 2/2006 | Moore et al. | |
| 7,007,092 B2 | 2/2006 | Peiffer | |
| 7,013,338 B1 * | 3/2006 | Nag et al. | 709/226 |
| 7,024,477 B2 | 4/2006 | Allan | |
| 7,027,055 B2 | 4/2006 | Anderson et al. | |
| 7,043,524 B2 | 5/2006 | Shah et al. | |
| 7,055,028 B2 | 5/2006 | Peiffer et al. | |
| 7,062,556 B1 | 6/2006 | Chen et al. | |
| 7,085,683 B2 | 8/2006 | Anderson et al. | |
| 7,099,933 B1 | 8/2006 | Wallace et al. | |
| 7,100,195 B1 | 8/2006 | Underwood | |
| 7,145,898 B1 | 12/2006 | Elliott | |
| 7,197,559 B2 | 3/2007 | Goldstein et al. | |
| 7,197,751 B2 | 3/2007 | Fedotov et al. | |
| 7,200,804 B1 | 4/2007 | Khavari et al. | |
| 7,206,811 B2 | 4/2007 | Skurikhin et al. | |
| 7,219,127 B2 | 5/2007 | Huck et al. | |
| 7,222,305 B2 | 5/2007 | Teplov et al. | |
| 7,318,100 B2 | 1/2008 | Demmer et al. | |
| 7,321,906 B2 | 1/2008 | Green | |
| 2001/0049717 A1 | 12/2001 | Freeman et al. | |
| 2001/0052016 A1 | 12/2001 | Skene et al. | |
| 2002/0004813 A1 | 1/2002 | Agrawal et al. | |
| 2002/0032780 A1 | 3/2002 | Moore et al. | |
| 2002/0035683 A1 | 3/2002 | Kaashoek et al. | |
| 2002/0059622 A1 | 5/2002 | Grove et al. | |
| 2002/0083175 A1 | 6/2002 | Afek et al. | |
| 2002/0083183 A1 | 6/2002 | Pujare et al. | |
| 2002/0087883 A1 | 7/2002 | Wohlgemuth et al. | |
| 2002/0091763 A1 | 7/2002 | Shah et al. | |
| 2002/0101819 A1 | 8/2002 | Goldstone et al. | |
| 2002/0107971 A1 | 8/2002 | Bailey et al. | |
| 2002/0116491 A1 | 8/2002 | Boyd et al. | |
| 2002/0116582 A1 | 8/2002 | Copeland et al. | |
| 2002/0120743 A1 | 8/2002 | Shabtay et al. | |
| 2002/0138640 A1 | 9/2002 | Raz et al. | |
| 2002/0138643 A1 | 9/2002 | Shin et al. | |
| 2002/0156911 A1 | 10/2002 | Croman et al. | |
| 2002/0161908 A1 | 10/2002 | Benitez et al. | |
| 2003/0004882 A1 | 1/2003 | Holler et al. | |
| 2003/0009538 A1 | 1/2003 | Shah et al. | |
| 2003/0014623 A1 | 1/2003 | Freed et al. | |
| 2003/0014625 A1 | 1/2003 | Freed et al. | |
| 2003/0014628 A1 | 1/2003 | Freed et al. | |
| 2003/0023734 A1 | 1/2003 | Martin et al. | |
| 2003/0033520 A1 | 2/2003 | Peiffer et al. | |
| 2003/0035370 A1 | 2/2003 | Brustoloni et al. | |
| 2003/0046577 A1 | 3/2003 | Silverman et al. | |
| 2003/0051100 A1 | 3/2003 | Patel | |
| 2003/0055962 A1 | 3/2003 | Freund et al. | |
| 2003/0065763 A1 | 4/2003 | Swildens et al. | |
| 2003/0182423 A1 | 9/2003 | Shafir et al. | |
| 2003/0226038 A1 | 12/2003 | Raanan et al. | |
| 2003/0233423 A1 | 12/2003 | Dilley et al. | |
| 2003/0236837 A1 | 12/2003 | Johnson et al. | |
| 2003/0236861 A1 | 12/2003 | Johnson et al. | |
| 2004/0073512 A1 | 4/2004 | Maung | |
| 2004/0073630 A1 | 4/2004 | Copeland et al. | |
| 2004/0215746 A1 | 10/2004 | McCanne et al. | |
| 2004/0236777 A1 | 11/2004 | Pardikar et al. | |
| 2004/0240387 A1 | 12/2004 | Nuzman et al. | |
| 2006/0080432 A1 | 4/2006 | Spataro et al. | |
| 2006/0089996 A1 | 4/2006 | Peiffer | |
| 2007/0067046 A1 | 3/2007 | Berg | |
| 2007/0179955 A1 | 8/2007 | Croft et al. | |
| 2007/0250631 A1 | 10/2007 | Bali et al. | |
| 2008/0049786 A1 | 2/2008 | Ram et al. | |
| 2008/0320151 A1 | 12/2008 | McCanne et al. | |

FOREIGN PATENT DOCUMENTS

| | | |
|---|---|---|
| WO | WO/00/28433 A2 | 5/2000 |
| WO | WO/00/28433 A3 | 5/2000 |
| WO | WO/00/45286 A1 | 8/2000 |
| WO | WO-02/23363 A1 | 3/2002 |
| WO | WO-02/39263 A2 | 5/2002 |
| WO | WO-02/39276 A2 | 5/2002 |
| WO | WO-02/42922 A2 | 5/2002 |
| WO | WO-03/088065 A1 | 10/2003 |

(56) References Cited

FOREIGN PATENT DOCUMENTS

WO     WO-2006/074072 A2     7/2006
WO     WO-2007/024647 A2     3/2007
WO     WO-2008/112691 A2     9/2008

OTHER PUBLICATIONS

Zheng Wang et al., "Prefetching in World Wide Web", University College London, United Kingdom, Nov. 18-22, 1996, pp. 1-12.

Mogul, J.C., "The Case for Persistent-Connection HTTP", Communication Review Conference, vol. 25, No. 4, pp. 299-313 XP000541665 ISSN-146-4833.

Egevang K. and Francis P., "The IP Network Address Translator (NAT)," Request fro Comments: 1631, May 1994, 9 pages.

Theo Schlossnagle, "Mod_backhand: Internals Explained", John Hopkins University, Apr. 5, 2001, 13 pages.

Fielding, R. et al., "Hypertext Transfer Protocol—HTTP/1.1," RFC 2616, Sections 3.6, 4.4, 8,14.13, 14.41, and 19.4.6, 19 pages, IETF, from http://www.w3.org/Protocols/rfc2616/rfc2616,Jun. 1999.

R. Rajamony et al., "Measuring Client-Perceived Response Times on the WWW", Mar. 2001, In Proc of 3rd USITS, San Francisco.

Office Action on U.S. Appl. No. 12/823,890 dated Dec. 29, 2011.

PR Newswire, "Netscreen Offers Free Software Upgrade to Leading Security Appliance to Help E-Businesses Defend Against Attacks," PR Newswire, Feb. 14, 2000, p. 1.

Theo Schlossnagle, "Mod_backhand: Internals Explained", John Hopkins Univ., Apr. 5, 2001, 13 pages.

International Preliminary Examination Report for PCT/US2002/023100, mailed on Oct. 29, 2003.

Non-Final Office Action for U.S. Appl. No. 09/912,401, mailed on Sep. 21, 2005.

Final Office Action for U.S. Appl. No. 09/912,401, mailed on Mar. 23, 2006.

Non-Final Office Action for U.S. Appl. No. 09/912,401, mailed on Oct. 11, 2006.

Final Office Action for U.S. Appl. No. 09/912,401, mailed on Apr. 9, 2007.

Non-Final Office Action for U.S. Appl. No. 09/912,401, mailed on May 28, 2008.

\* cited by examiner

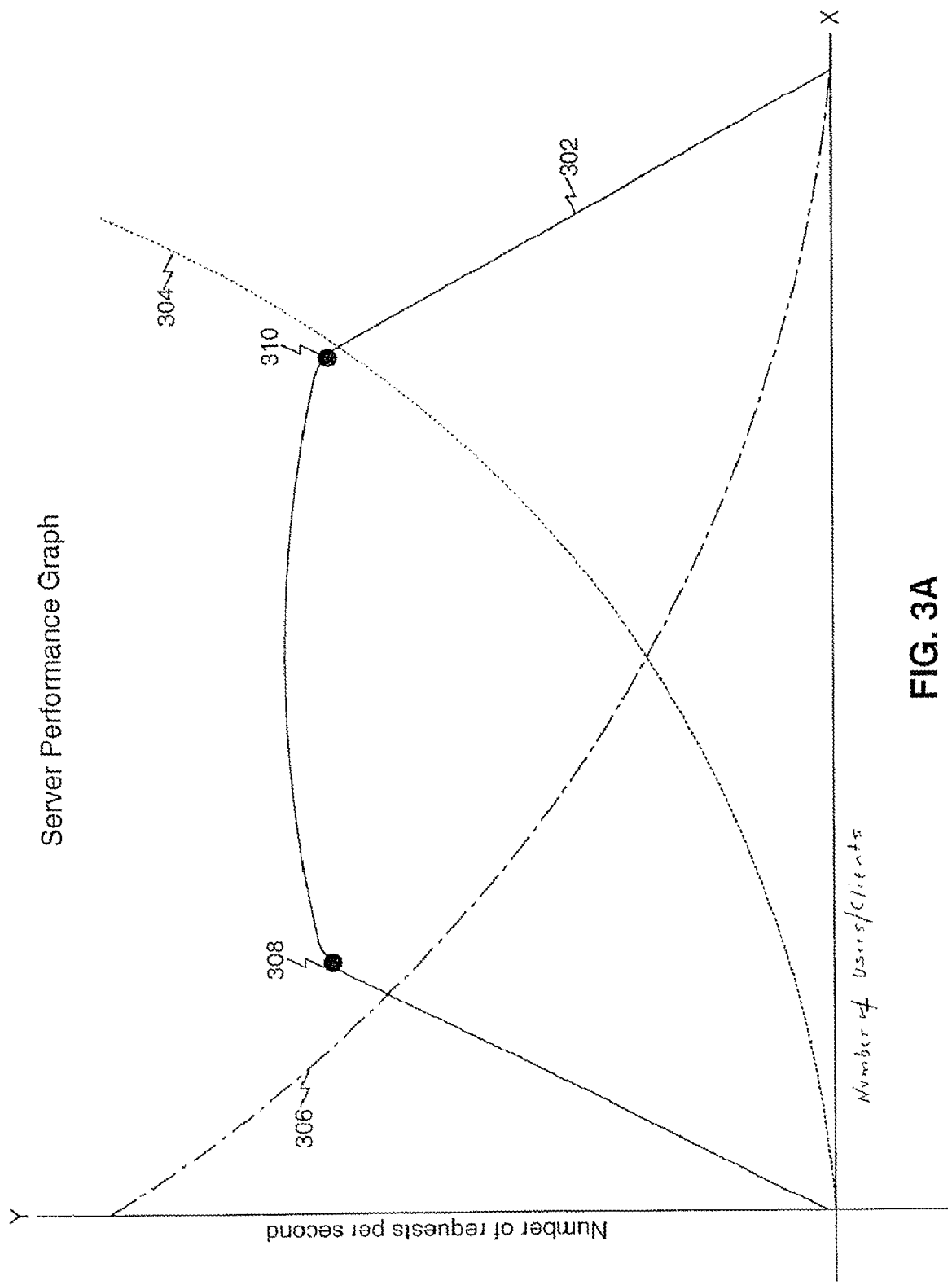

SYSTEMS AND METHODS FOR CONTROLLING THE NUMBER OF CONNECTIONS ESTABLISHED WITH A SERVER

CROSS-REFERENCE TO RELATED APPLICATIONS

This present application is a divisional of and claims priority to U.S. patent application Ser. No. 09/912,401, entitled "System, Method And Computer Program To Maximize Server Throughput While Avoiding Server Overload By Controlling The Rate Of Establishing Server-Side Network Connections" and filed Jul. 26, 2001, which is incorporated herein by reference.

U.S. patent application Ser. No. 09/912,401 is related to pending application Ser. No. 09/188,709, filed Nov. 10, 1998, entitled "Internet Client-Server Multiplexer," incorporated herein by reference in its entirety.

U.S. patent application Ser. No. 09/912,401 is also related to pending application Ser. No. 09/690,437, filed Oct. 18, 2000, entitled "Apparatus, Method and Computer Program Product for Efficiently Pooling Connections Between Clients and Servers," incorporated herein by reference in its entirety.

BACKGROUND OF THE INVENTION

1. Field of the Invention

The present invention relates generally to Internet client-server applications, and more specifically to a way of maximizing server throughput while avoiding server overload by controlling the rate of establishing server-side network connections.

2. Background Art

The importance to the modern economy of rapid information and data exchange cannot be overstated. This explains the exponentially increasing popularity of the Internet. The Internet is a world-wide set of interconnected computer networks that can be used to access a growing amount and variety of information electronically.

One method of accessing information on the Internet is known as the World Wide Web (www, or the "web"). The web is a distributed, hypermedia system and functions as a client-server based information presentation system. Information that is intended to be accessible over the web is stored in the form of "pages" on general-purpose computers known as "servers." Computer users can access a web (or HTML) page using general-purpose computers, referred to as "clients," by specifying the uniform resource locator (URL) of the page. Via the URL, the network address of the requested server is determined and the client request for connection is passed to the requested server. FIG. 1 is a network block diagram showing a plurality of clients and servers connected to the Internet.

Once the requested server receives the client request for connection, the client and server must typically exchange three packets of information to setup a connection. The number of packets specified above for opening a connection (or specified below for closing a connection) assumes that there is no packet loss in the process of connection establishment. In the event packet loss occurs, then the number of exchanged packets will increase correspondingly. A page typically consists of multiple URL's and in fact it is not uncommon to find websites with 40 or more URL's per page.

Once the connection is established, a client sends one or more URL (page) requests to the server, which consists of one or more packets. The server will then send one or more packet responses back to the client. Once a request and response is exchanged from the client and server, both client and server may close their respective connections. The closing of the connection takes a minimum of four additional packets of information exchange. Therefore, there is a significant amount of processing overhead involved in downloading even a single URL for a client where that client does not already have a connection established with the server.

Each packet that reaches the server interrupts the server's CPU to move that packet from the Network Interface Card (NIC) into the server's main memory. This process uses up server resources and results in loss of productivity on the server's CPU. In addition, to establish a connection at the server side the packet needs to be processed by the driver layer, where Ethernet specific information is handled. The driver layer sends the packet to the IP (Internet Protocol) layer for more processing, where all the IP related processing is handled. After this, the packet is passed to TCP (Transmission Control Protocol) layer, where the TCP related information is processed. The TCP layer consumes significant server resources to create a connection table, etc.

Most servers incorporate multitasking, which also consumes server resources and therefore may increase server response time. Multitasking, which is well known in the relevant art(s), is the ability to execute more than one task at the same time. Examples of a task include processing a URL or page request in order to service an existing client, establishing a new connection in order to accept new clients (which involves, at a minimum, essentially three tasks as described above), closing a connection to an existing client (which involves, at a minimum, essentially four tasks as described above), etc. In multitasking, one or more processors are switched between multiple tasks so that all tasks appear to progress at the same time. There are at least two basic types of multitasking that are well known to those skilled in the art, including preemptive and cooperative.

Whether the operating system of a particular server (including, but not limited to, application servers and database queuing) uses preemptive or cooperative multitasking, the response time to URL (page) requests increases as there are more tasks in the system, including tasks in the form of URL requests from more clients. In addition, the response time to a page request increases as the number of new clients trying to gain access to the server increases within a short period of time. For example, if a surge of new clients attempt to gain access to the server at the same time, then under certain load conditions the server may spend the majority of its processing resources accepting new clients rather than servicing its existing clients. A surge of new clients can be the result of a popular web site attracting many new visitors, a server attack, and so forth. A server attack happens with one or more malicious users make regular requests that are issued at a very high rate in the attempt to crash a server.

Servers are also faced with the unpredictable and erratic nature of internet traffic and the inconsistent arrival of requests over the web. Many factors contribute to the wide variability of web traffic including the popularity of a URL or website, the variations in performance of the multiple points of web infrastructure encountered by a request as it traverses the net, including routers, switches and proxy devices and the overall congestion on the infrastructure over which the traffic is being carried.

Servers are designed to do certain things well. Servers are typically general-purpose machines that are optimized for general tasks such as file management, application processing, database processing, and the like. Servers are not optimized to handle switching tasks, such as opening and closing network connections. Under certain load conditions, these tasks can represent a considerable overhead, consuming a large percentage of the server's processing resources, often on the order of twenty percent and sometimes up to fifty percent. This problem is referred to herein as "connection loading."

The server may provide to its existing clients unacceptably slow server response time when the server is forced to spend most of its processing resources accepting new clients and therefore not servicing existing clients. In fact, when there is no limit on the amount of clients a server is accepting and/or servicing, often times the result is declining server performance, including server failure or crash and/or the failure to service some or all requests coming to it. Some servers, once they reach processing capacity, may just drop or block a connection request. When the response time for a server is unacceptably slow and/or has a tendency to crash often and/or the client's connection request is blocked or dropped, the owner of the server may lose business. This loss of business is detrimental to anyone seeking to conduct business over the Internet.

BRIEF SUMMARY OF THE INVENTION

The present invention is a system, method and computer program product for maximizing server throughput while avoiding server overload by controlling the rate of establishing server-side network connections. The present invention ensures acceptable server response time by monitoring the current response time of a particular server (or set of servers) for its (or their) existing clients and then only allowing a new client to make a connection with a particular server if the server's current response time will remain acceptable. In an embodiment, the present invention is implemented within an interface unit connecting one or more servers to the Internet, which are in turn connected to a plurality of clients.

According to an embodiment of the invention, the method includes the steps of opening a connection between a new client and an interface unit; determining whether a free connection is open between the interface unit and a requested server, and if so, then allowing the new client to access information on the requested server via the free connection; determining whether opening a new connection between the interface unit and the requested server would cause the requested server to allocate an unacceptable amount of its processing resources to servicing one or more existing clients (i.e., whether the server is operating beyond a range that is acceptably close to its determined optimal performance), and if so, then buffering the new client. Once the amount of allocated processing resources reaches an acceptable level, then the method includes the steps of allowing the new client to access information on the requested server via either the free connection or the new connection. After serving the requested information, the method includes the steps of closing the connection between the new client and the interface unit while keeping open the free connection and the new connection between the interface unit and the requested server.

In an embodiment of the present invention, multiplexed connections are used and reused to regulate the flow of HTTP requests to a server or server farm rather than blocking or dropping new requests once maximum server capacity is reached.

In another embodiment, the present invention uses an interface unit to compute server load (or performance) by considering the number of connections that have been opened with a server, by monitoring changes in server response time and by monitoring changes in the rate at which such response time is changing. This helps to avoid server overload.

One advantage of the present invention is that it guarantees that a server will have processing resources available to serve a response to a client once the client's request has been passed to the appropriate server.

Another advantage of the present invention is that it eliminates a significant cause of server crashes whereby too many new clients in a short period of time are trying to gain access to the server.

Yet another advantage of the present invention is that it may give preferential treatment to certain clients in order for the preferred clients to more readily gain access to the server and thus generate more business and enable preferential treatment for higher priority customers for the server owner.

Another advantage of the present invention is that it helps to protect the server from a server attack.

BRIEF DESCRIPTION OF THE DRAWINGS/FIGURES

The features and advantages of the present invention will become more apparent from the detailed description set forth below when taken in conjunction with the drawings in which like reference characters identify corresponding elements throughout and wherein:

FIG. 3A illustrates server performance according to an embodiment of the present invention;

DETAILED DESCRIPTION OF THE INVENTION

The present invention is a system, method and computer program product for maximizing server throughput, while avoiding server overload, by controlling the rate of establishing server-side network connections.

Figure 1:
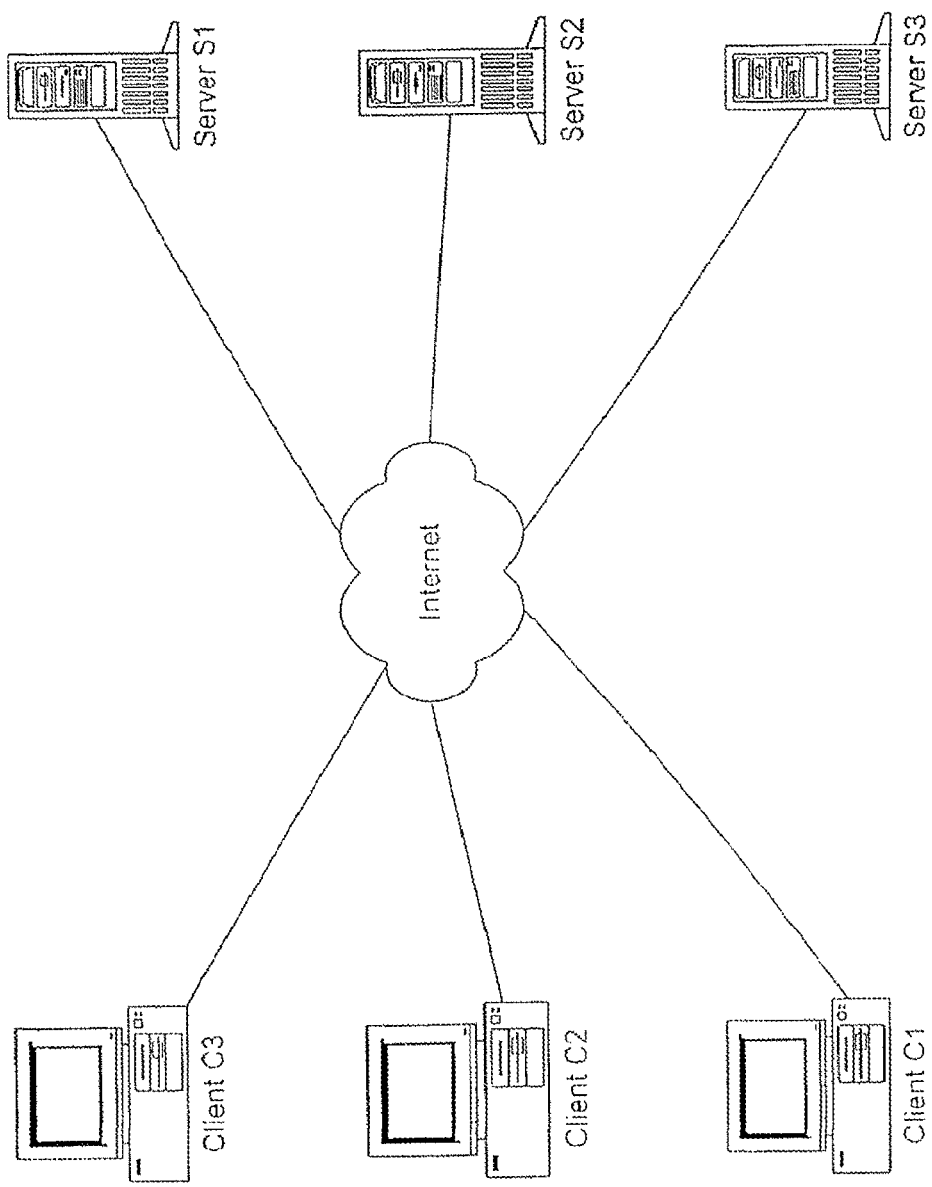
FIG. 1 is a network block diagram showing a plurality of clients and servers connected to the Internet.
Figure 2:
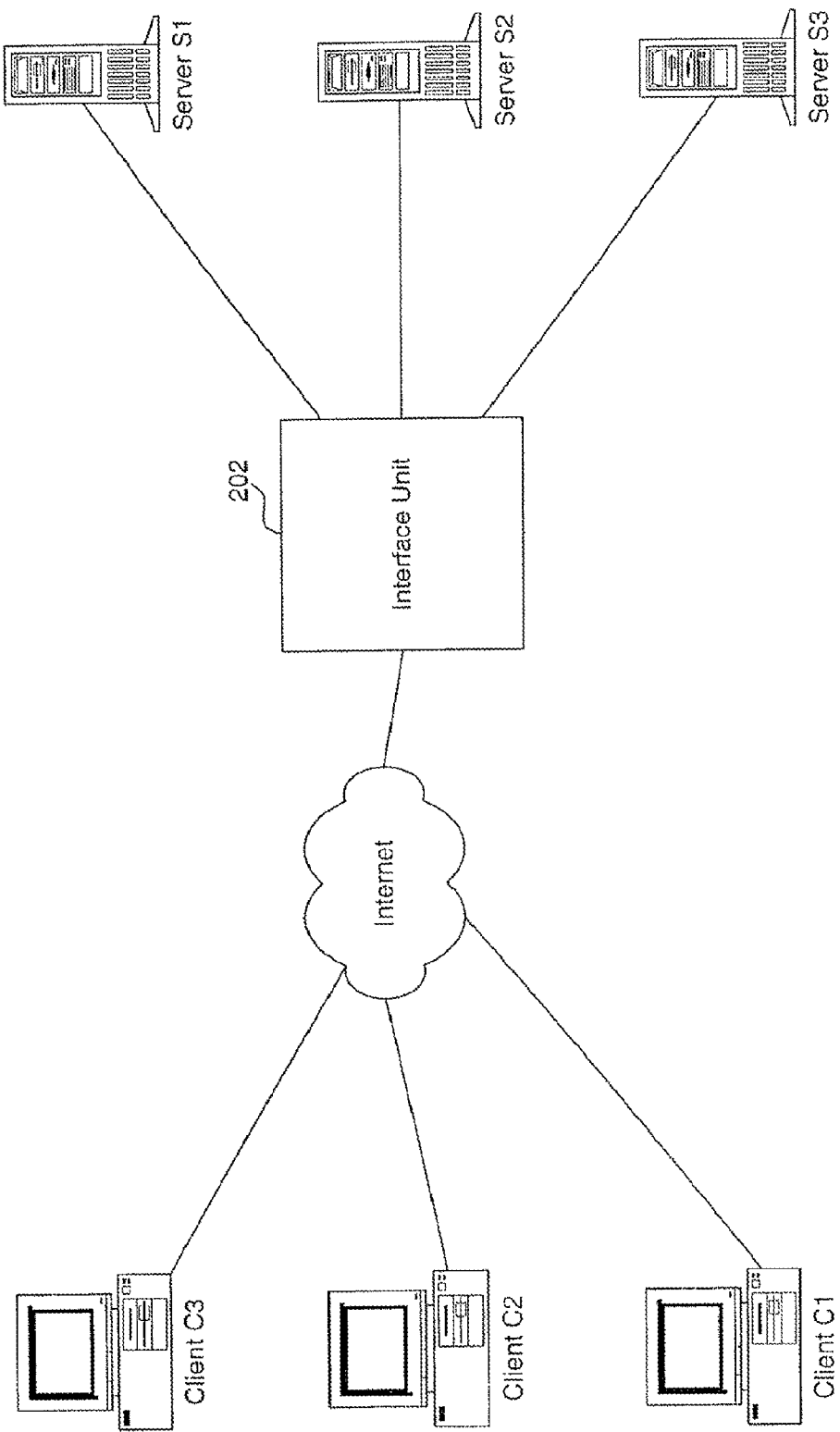
FIG. 2 is a network context diagram for an interface unit according to an embodiment of the present invention.

FIG. 2 is a network context diagram for an interface unit 202 according to an embodiment of the present invention. In an embodiment, interface unit 202 is an intelligent network interface card with a CPU inside a server. Interface unit 202 can also be an intelligent box sitting outside the server, in which case it can serve more than one server. Interface unit 202 can also be a load balancer, bandwidth manager, firewall, proxy-cache, router, switch, computer system, or any other network device that is located between a client and server.

Referring to FIG. 2, a plurality of clients C1, C2, C3 are coupled to the Internet. A plurality of servers S1, S2, S3 are coupled to the Internet by interface unit 202. Servers S1, S2, S3 are collectively referred to as a "server farm." In an embodiment of the present invention, all Internet traffic with the server farm passes through interface unit 202. While the present invention is described in terms of the Internet, the concepts described also apply to other types of networks, as will be apparent to one skilled in the relevant art.

In an embodiment of the present invention, interface unit 202 relieves servers S1, S2, S3 of much of the processing load caused by repeatedly opening and closing connections to clients by opening one or more connections with each server and maintaining these connections to allow repeated data accesses by clients via the Internet. This technique is referred to herein as "connection pooling." Interface unit 202 also transparently splices connections from servers and clients using a technique referred to herein as "connection multiplexing." In an embodiment of the present invention, multiplexed connections are used and reused to regulate the flow of HTTP requests to a server or server farm rather than blocking or dropping new requests once maximum server capacity is reached. The techniques of "connection pooling" and "connection multiplexing" are described in detail in related pending application Ser. No. 09/188,709, filed Nov. 10, 1998, titled "Internet Client-Server Multiplexer," incorporated herein by reference in its entirety and Ser. No. 09/690,437, filed Oct. 18, 2000, titled "Apparatus, Method and Computer Program Product for Efficiently Pooling Connections Between Clients and Servers," incorporated herein by reference in its entirety.

In the present invention, interface unit 202 avoids server overload by regulating the rate (and the increase in the rate) at which TCP connections received by remote clients are delivered to a server or set of servers. The present invention uses interface unit 202 to compute server load (or performance) by considering one or more of (but is not limited to): the number of connections that have been opened with a server, by monitoring changes in server response time, by monitoring changes in the rate at which such response time is changing, by monitoring the mix of requests pending at the server at any point in time and by monitoring error/overload messages as they are generated by the server. The maximum number of connections to the server that can be maintained without performance degradation or generating server error/overload messages and the rate at which the server can accept new clients while still providing an acceptable response time to existing clients varies both depending on the kind of server infrastructure implemented as well as the type and rate of requests coming in to that server for any given time period.

FIG. 3A is a plotted graph illustrating performance or load of a server. FIG. 3A is a graph representing the number of requests per second to the server or server farm (represented by the y axis) and the number of users or clients currently being served by the server (represented by the x axis). Line 302 represents server throughput, line 304 represents current server response time to a client request, and line 306 represents the rate at which the invention opens connections to the server.

Point 308 on throughput line 302 illustrates a point on the graph in which the server has reached maximum throughput. Point 310 on line 302 illustrates the server having similar throughput as point 308 (as does all of the points in between point 308 and 310). Server performance, as represented by line 302, reaches a plateau as shown on the graph when the server reaches its maximum capacity for servicing requests and remains level even as users increase as a result of latencies in request delivery made by the users. A feature of the present invention is to keep the server's performance as close as possible to point 308, as compared to point 310, even though points 308 and 310 show similar amounts of throughput. Comparing points 308 and 310, at point 308 the response time is less, the number of users is less and the number of open connections is greater than at point 310. Therefore, it is desirable for a server to be performing as close as possible to point 308. How the present invention ensures that the server's performance remains as close as possible to point 308 will be described with reference to FIG. 4 below.

Figure 3B:
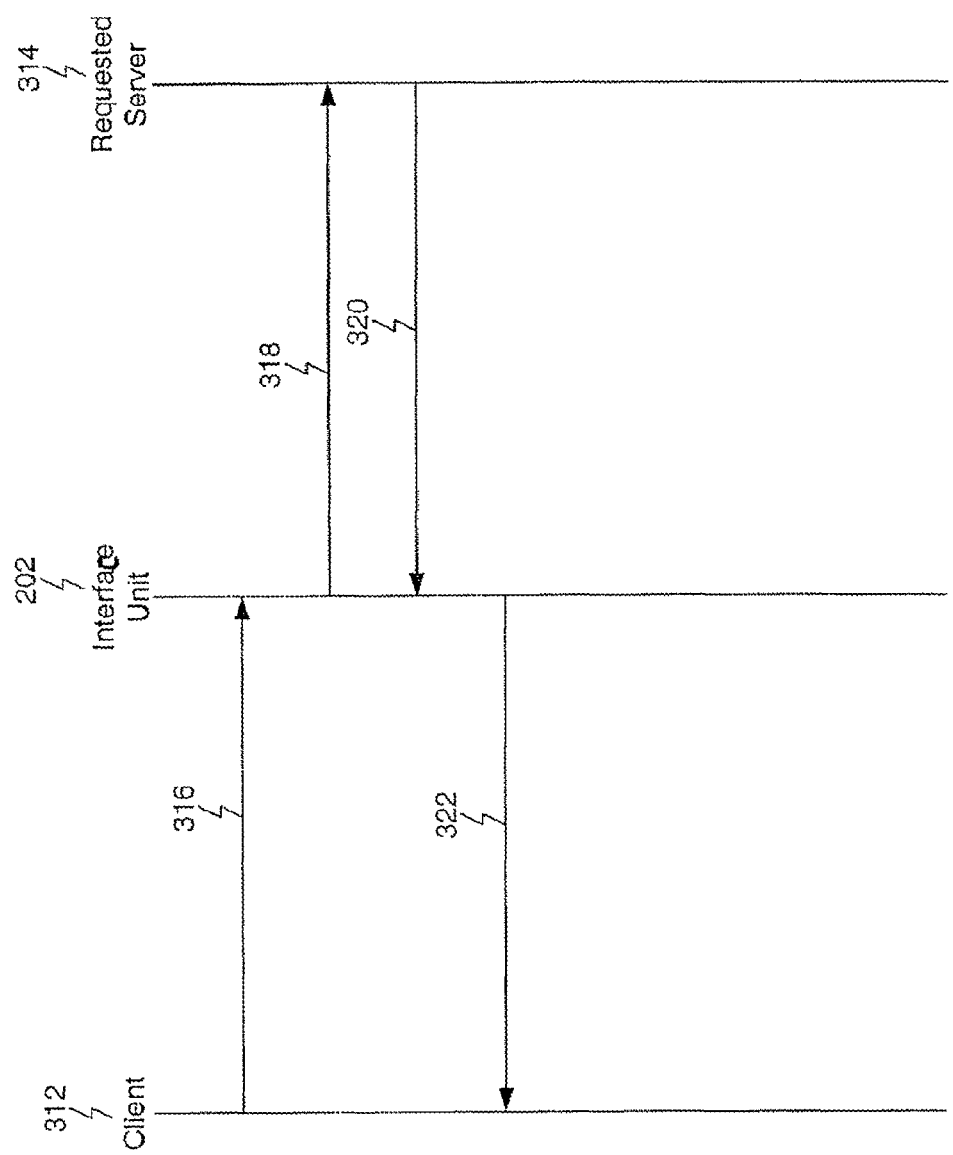
FIG. 3B is a time line illustrating how the present invention computes server overload or performance in a nonintrusive way according to an embodiment.

As stated above, all Internet traffic with the server or server farm passes through interface unit 202. The position of the interface unit 202 enables it to compute server load and performance in a nonintrusive way. This can be illustrated with the time line referenced in FIG. 3B. In FIG. 3B, a client 312 first forwards a request that is intercepted by interface unit 202. This is shown by time line 316. Then, as shown by time line 318, interface unit 202 determines when to forward the request from client 312 to a requested server 314. At time line 320, requested server 314 forwards the requested information which is intercepted by interface unit 202. Here, the present invention may simply calculate the difference between time line 318 (when the request was sent to server 404) and time line 320 (when the request was filled) to determine the server response time. The present invention may also consider the number of pending requests sent to the server and how long they have been pending to calculate server response time. In addition, the invention may use error and overload messages that it has received from the server to adjust what the optimal performance or load should be for a particular server. It is important to note optimal server load is determined on a dynamic basis as optimal performance varies through time depending on the type of requests pending on the server at any point in time. The interface unit 202 considers not just overall server performance knowledge, but also the mix of requests presently pending at the server. In any event, the current response time is calculated in a nonintrusive matter since server 404 is not aware of this calculation. Finally, as shown by time line 322, the requested information is forwarded to client 312 by interface unit 202.

Figure 4:
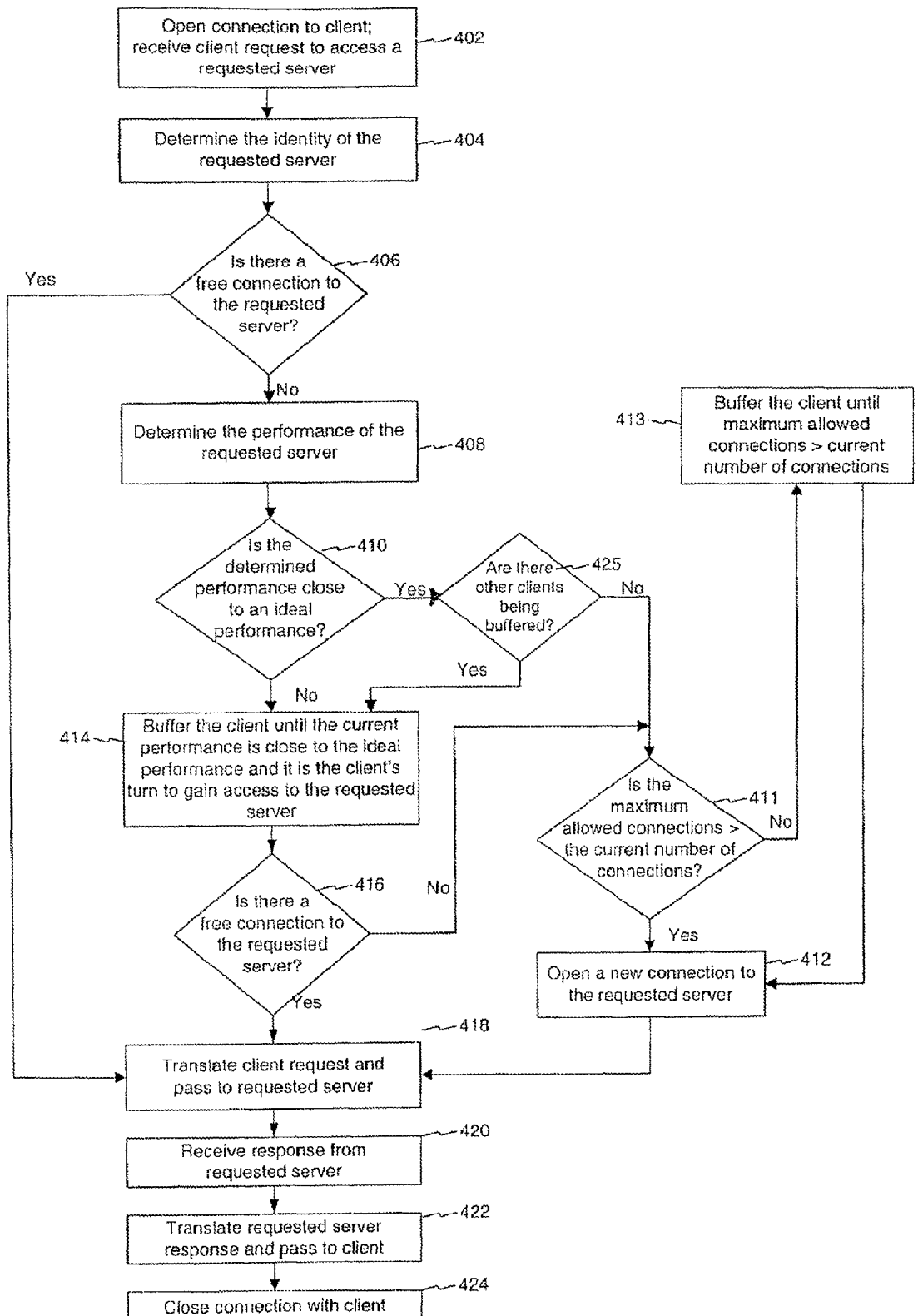
FIG. 4 is a flowchart illustrating the high level operation of the present invention according to an embodiment of the present invention.

FIG. 4 is a flowchart illustrating how the present invention ensures that a server's performance remains as close as possible to point 308 (FIG. 3). FIG. 4 incorporates the "connection pooling" and "connection multiplexing" techniques mentioned above. It is important to note that although FIG. 4 illustrates using "connection pooling" and "connection multiplexing," the present invention is not limited to using these techniques.

The process in FIG. 4 begins when a client requests access to one of the servers in the server farm (herein referred to as the "requested server") tended by interface unit 202. A connection is opened between interface unit 202 and the requesting client, and interface unit 202 receives the client request to access the requested server, as shown in step 402.

Next, interface unit 202 determines the identity of the requested server as shown in step 404. In one embodiment, this is accomplished by examining the destination network address specified by the client request. In another embodiment, this is accomplished by examining the network address and path name specified by the client request.

After determining the identity of the server to which the client request should be directed, interface unit 202 utilizes the "connection pooling" technique by determining whether a free connection (that is, one that is not in use) to the requested server is already open, as shown in step 406.

One aspect of the present invention is to limit the maximum number of allowable connections to the requested server. As described above, the requested server utilizes processing resources to open a new connection to the requested server in order to accept a new client. The maximum number of allowable connections may be set in several ways. One way is a hard limit configured by the system administrator. Another way is to dynamically determine the number of maximum connections at which the server response time exceeds a predetermined threshold. Another way is by looking at the queue of requests pending at the server (as opposed to requests buffered on the present invention) and comparing it with the maximum capacity of such server queue. Therefore, if there is a free connection in step 406, then the present invention utilizes that connection to service the client. Also discussed below in step 413 and step 414, interface unit 202 buffers the client when there are no free connections available (and the maximum connections are already allocated). Therefore, it is assumed that if there is a free connection then there are no clients being buffered by interface unit 202 at that time. At this point, control passes to step 418 where the client's request is translated and passed to the requested server, as is more fully described with respect to FIG. 7 below.

Alternatively in step 406, if there is no free connection to the requested server, then the present invention determines the current performance of the requested server, as shown in step 408. It is important to ensure that an acceptable amount of the requested server's processing resources is being used to process existing clients. As explained above with reference to FIG. 3, the present invention ensures that the server's performance is as close as possible to point 308. Optimal server load is determined on a dynamic basis by considering not just overall server performance knowledge, but also on the mix of requests presently pending at the server. If the present invention determines that the amount of processing resources being used to process existing clients is not acceptable, then the present invention prevents another client from gaining access to the requested server. For example, if there is a sudden surge of new clients attempting to gain access to the requested server at the same time, then without the present invention the requested server would spend most of its processing resources servicing the new clients (i.e., opening connections) and not servicing existing clients. As stated above, this can result in unacceptable server response time and/or a server crash, and/or other server performance problems.

For illustration purposes only, assume that the present invention has dynamically determined that with a given mix of requests on the server, in order for the requested server to perform within a range that is acceptably close to point 308 (FIG. 3), the requested server should spend ninety (90) percent of its processing resources to service existing clients and ten (10) percent of its processing resources to accept new clients. Therefore, for the requested server the present invention pre-determines that the requested server's optimal percentage to service existing clients is 90%. In other words, when the requested server is spending 90% of its resources on servicing existing clients, then its performance is within a range that is acceptably close to point 308 (FIG. 3).

As shown in step 410 of FIG. 4, the present invention next determines whether the determined performance (step 408) is within a range that is acceptably close to an optimal performance (i.e., point 308 in FIG. 3A). How this may be determined is described in more detail below with reference to FIG. 8 below. If the outcome to step 410 is positive, then this indicates to interface unit 202 that the requested server is performing within a range that is acceptably close to point 308 and therefore the requested server can accept a new client without increasing the response time to an unacceptable level. If the outcome to step 410 is positive, then control passes to step 425.

The present invention must not service the client if there are other clients that have been buffered previously by interface unit 202 that are still waiting to be serviced, as shown in step 425. In step 425, if there are other clients waiting to be serviced, then control passes to step 414 where the client is buffered by interface unit 202. Alternatively, control passes to step 411.

In step 411, interface unit 202 ensures that a maximum number of connections to the requested server is not exceeded. Here, the maximum number of allowed connections is compared to the current number of connections to the requested server. If the current number of connections is less than or equal to the maximum number of allowed connections, then control passes to step 412 where interface unit 202 may open a new connection to the requested server. Alternatively, if the current number of connections is greater than the maximum number of allowed connections, then interface unit 202 buffers the client until the current number of connections is less than the maximum number of allowed connections, as shown by step 413.

Alternatively, if the outcome to step 410 is negative, then this indicates to interface unit 202 that the requested server is not performing as closely as desired to point 308. Here it is likely that the requested server is currently spending more of its processing time performing tasks other than servicing existing clients than allowed. Here, interface unit 202 buffers the client until the current performance is within a range that is acceptably close to the optimal performance and it is the client's turn to gain access to the requested server, as shown in step 414, and as more fully described with respect to FIGS. 5 and 6 below. Interface unit 202 then determines if there is a free connection open to the requested server, as shown in step 416. Interface unit 202 knows to free up a connection when the client utilizing that connections initiates a FIN (finish) command, a RST (reset) command, or via one of the novel ways described in related pending application Ser. No. 09/690,437, filed Oct. 18, 2000, entitled "Apparatus, Method and Computer Program Product for Efficiently Pooling Connections Between Clients and Servers," incorporated herein by reference in its entirety. In all of these scenarios, interface unit 202 waits until it receives one of these commands before it closes the connection between itself and the client and frees up the connection between interface unit 202 and the requested server. Therefore, if there is a free connection, then interface unit 202 utilizes that connection to service the client and control passes to step 418. Alternatively, interface unit 202 ensures that the maximum number of allowed connections to the requested server is not exceeded, as shown in step 411.

Interface unit 202 then translates the client request and passes it to the requested server, as shown in step 418, and as more fully described with respect to FIG. 7 below. After server processing, interface unit 202 receives a response from the requested server, as shown in step 420. The server response is translated and passed to the requesting client, as shown in step 422, and described further below. Finally, interface unit 202 closes the connection with the client as shown in step 424, and the flowchart in FIG. 4 ends. However, by utilizing the "connection pooling" and "connection multiplexing" techniques referenced above, the connection between interface unit 202 and the requested server is not disconnected. However, the present invention may close down the connection if it determines that the server is currently overloaded (i.e., current load is greater than the optimal load).

Figure 8:
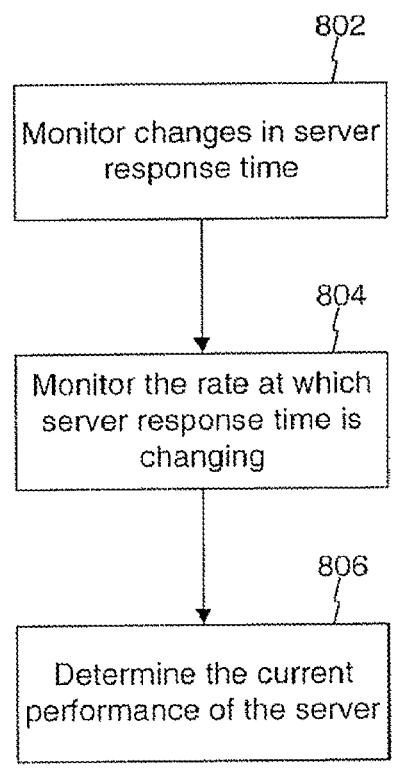
FIG. 8 is a flowchart depicting one embodiment of the operation of the present invention in determining the current performance of the requested server according to an embodiment.

FIG. 8 is a flowchart depicting one embodiment of the operation of the present invention in determining the current performance of the requested server, as shown in step 408. Note that by determining the performance of the requested server, the present invention is also determining server load. In step 802, the present invention monitors the changes in server response time for one client request to the next.

Next, the present invention monitors the rate at which the server response time is changing, as shown in step 804.

Finally, the present invention determines the current performance of the server based on one or more of the following, the monitored response time, the monitored rate at which the server response time is changing, and the number of connections to the server. The flowchart in FIG. 4 ends at this point.

Figure 5:
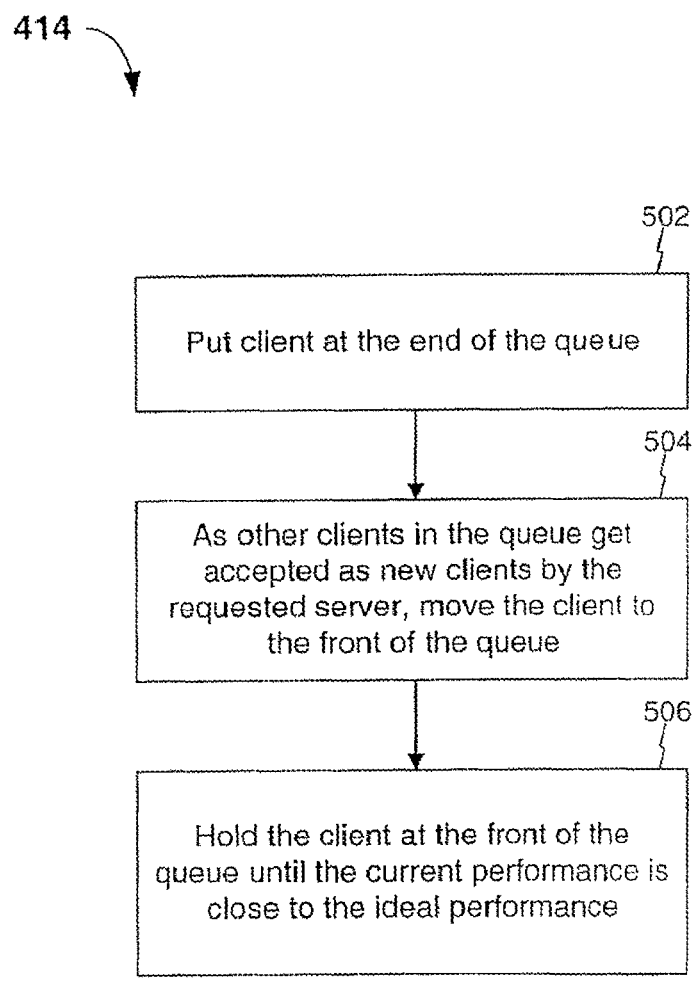
FIG. 5 is a detailed flowchart illustrating the buffering aspect of the present invention according to an embodiment.

FIG. 5 is a flowchart depicting one embodiment of the operation of the present invention in buffering the client, as shown in step 414. Here, interface unit 202 uses a first-in-first-out method (FIFO) to queue the buffered clients. The FIFO method is well known in the relevant art(s) and is not meant to limit the present invention. In step 502 of FIG. 5, interface unit 202 puts the client at the end of the queue. As other clients in the queue get accepted as new clients by the requested server, interface unit 202 moves the client to the front of the queue, as shown in step 504.

In step 506, interface unit 202 holds the client at the front of the queue until the current performance is within a range that is acceptably close to the optimal performance (i.e., close to point 308 of FIG. 3). At this point the flowchart in FIG. 5 ends.

Figure 6:
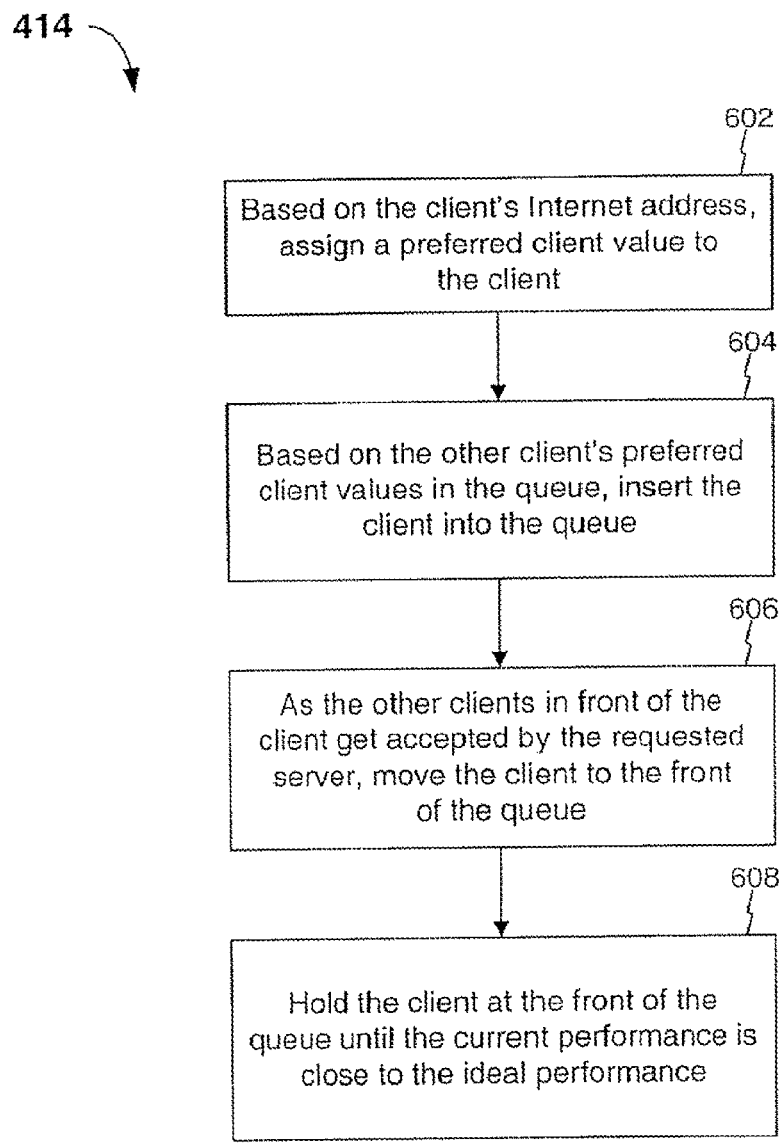
FIG. 6 is a detailed flowchart illustrating the buffering aspect of the present invention according to another embodiment.

FIG. 6 is a flowchart depicting another embodiment of the operation of the present invention in buffering the client, as shown in step 414. Here, the present invention gives preferential treatment to some clients over other clients. A preferred client may be defined by the server and stored by interface unit 202. For example, a server who manages a web site that sells products to retailers may want to give a large chain store preferential treatment to access its web site over smaller stores with less significant order volumes. One way in which interface unit 202 can assign the appropriate preferred client value to the client is by the client's network address, as shown in step 602. This can simply be a look-up table with network addresses and associated preferred client values provided to interface unit 202 by the requested server and can be based on one or both of the client's internet address or the port address. Other ways in which interface unit 202 may assign the appropriate preferred client value involves information stored in headers related to clients, previous actions of clients, or by cookies related to clients, etc.

The client is placed into the queue based on its preferred client value, as shown in step 604. Here, the client is not automatically placed at the end of the queue. In fact, if the client's preferred client value is higher than any of the other clients in the queue, the client may be placed automatically at the front of the queue. The present invention may also factor other variables into adjusting each client's preferred client value once in the queue. Such factors may include how long the client has been in the queue, and so forth.

As other clients in the queue get passed by the interface unit 202 to their requested server, interface unit 202 moves the client to the front of the queue, as shown in step 606.

In step 608, interface unit 202 holds the client at the front of the queue until the current performance is within a range that is acceptably close to the optimal performance as was determined for the server by the present invention. At this point the flowchart in FIG. 6 ends.

Figure 7:
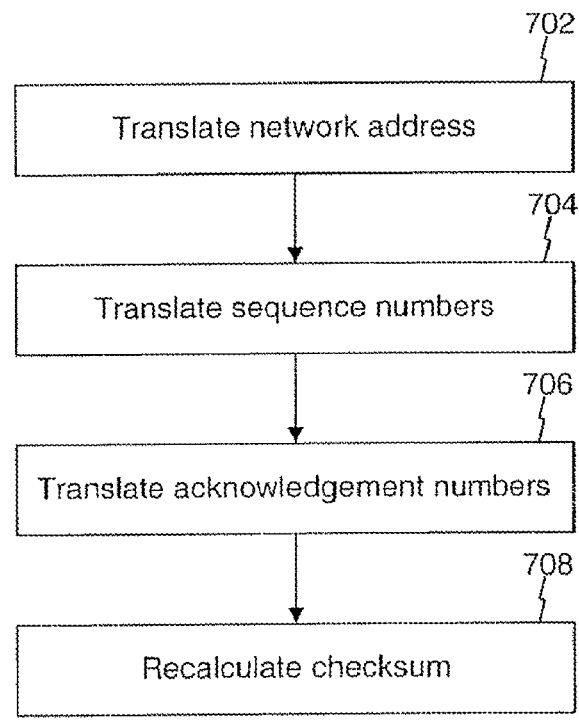
FIG. 7 is a flowchart depicting the operation of the present invention in translating client and server requests to achieve connection multiplexing.

FIG. 7 is a flowchart depicting the operation of the present invention in translating client and server requests to achieve connection multiplexing, as shown in steps 418 and 422 (FIG. 4). In an embodiment of the present invention, multiplexed connections are used and reused to regulate the flow of HTTP requests to a server or server farm rather than blocking or dropping new requests once maximum server capacity is reached.

In an embodiment, the message traffic is in the form of TCP/IP packets, a protocol suite that is well-known in the art. The TCP/IP protocol suite supports many applications, such as Telnet, File Transfer Protocol (FTP), e-mail and Hyper-Text Transfer Protocol (HTTP). The present invention is described in terms of the HTTP protocol. However, the concepts of the present invention apply equally well to other TCP/IP applications, as will be apparent to one skilled in the art after reading this specification.

Each TCP packet includes a TCP header and an IP header. The IP header includes a 32-bit source IP address and a 32-bit destination IP address. The TCP header includes a 16-bit source port number and a 16-bit destination port number. The source IP address and port number, collectively referred to as the source network address, uniquely identify the source interface of the packet. Likewise, the destination IP address and port number, collectively referred to as the destination network address, uniquely identify the destination interface for the packet. The source and destination network addresses of the packet uniquely identify a connection. The TCP header also includes a 32-bit sequence number and a 32-bit acknowledgment number.

The TCP portion of the packet is referred to as a segment. A segment includes a TCP header and data. The sequence number identifies the byte in the string of data from the sending TCP to the receiving TCP that the first byte of data in the segment represents. Since every byte that is exchanged is numbered, the acknowledgment number contains the next sequence number that the sender of the acknowledgment expects to receive. This is therefore the sequence number plus one of the last successfully received bytes of data. The checksum covers the TCP segment, i.e., the TCP header and the TCP data. This is a mandatory field that must be calculated and stored by the sender and then verified by the receiver.

In order to successfully route an inbound packet from a client to the intended server, or to route an outbound packet from a server to a client, interface unit 202 employs a process known as "network address translation." Network address translation is well-known in the art, and is specified by request for comments (RFC) 1631, which can be found at the URL http://www.safety.net/RF700631.txt.

However, in order to seamlessly splice the client and server connections, the present invention also employs the novel translation technique of "connection multiplexing" as described in detail in related pending application Ser. No. 09/188,709, filed Nov. 10, 1998, titled "Internet Client-Server Multiplexer." According to this technique, the present invention translates a packet by modifying its sequence number and acknowledgment number at the TCP protocol level. A significant advantage of this technique is that no application layer interaction is required.

Referring to FIG. 7, the network address of the packet is translated, as shown in step 702. In the case of an in-bound packet (that is, a packet received from a client), the source network address of the packet is changed to that of an output port of the interface unit and the destination network address is changed to that of the intended server. In the case of an outbound packet (that is, one received from a server), the source network address is changed from that of the server to that of an output port of the interface unit and the destination address is changed from that of the interface unit to that of the requesting client. The sequence numbers and acknowledgment numbers of the packet are also translated, as shown in steps 704 and 706 and described in detail below. Finally, the packet checksum is recalculated to account for these translations, as shown in step 708.

Figure 9:
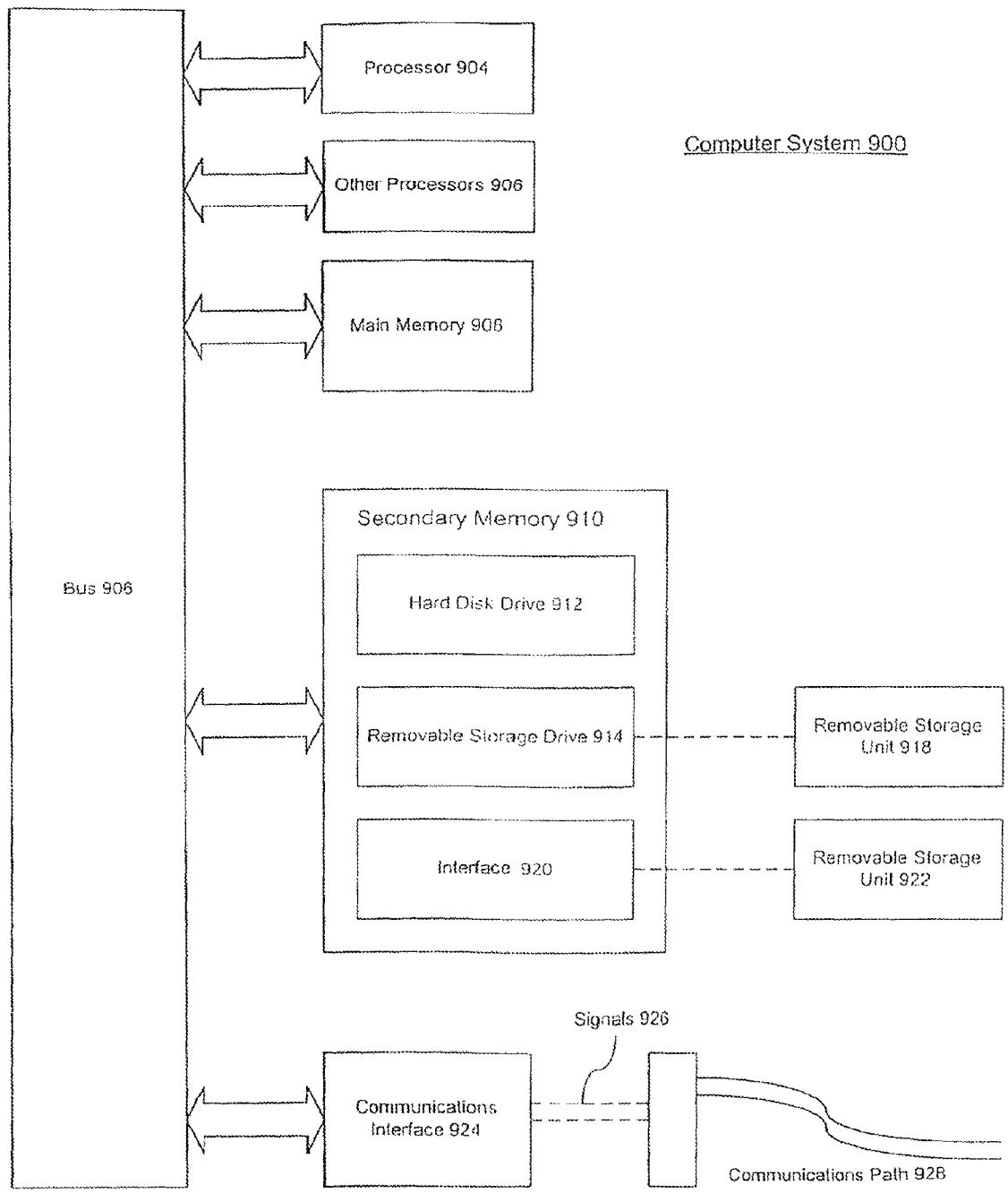
FIG. 9 depicts an example computer system in which the present invention can be implemented.

The present invention may be implemented using hardware, software or a combination thereof and may be implemented in a computer system or other processing system. In fact, in one embodiment, the invention is directed toward one or more computer systems capable of carrying out the functionality described herein. An example computer system 900 is shown in FIG. 9. The computer system 900 includes one or more processors, such as processor 904. The processor 904 is connected to a communication bus 906. Various software embodiments are described in terms of this example computer system. After reading this description, it will become apparent to a person skilled in the relevant art how to implement the invention using other computer systems and/or computer architectures.

Computer system 900 also includes a main memory 908, preferably random access memory (RAM) and can also include a secondary memory 910. The secondary memory 1010 can include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well known manner. Removable storage unit 918, represents a floppy disk, magnetic tape, optical disk, etc. which is read by and written to by removable storage drive 914. As will be appreciated, the removable storage unit 918 includes a computer usable storage medium having stored therein computer software and/or data.

In alternative embodiments, secondary memory 910 may include other similar means for allowing computer programs or other instructions to be loaded into computer system 900. Such means can include, for example, a removable storage unit 922 and an interface 920. Examples of such can include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 918 to computer system 900.

Computer system 900 can also include a communications interface 924. Communications interface 924 allows software and data to be transferred between computer system 900 and external devices. Examples of communications interface 924 can include a modem, a network interface (such as an Ethernet card), a communications port, a PCMCIA slot and card, etc. Software and data transferred via communications interface 924 are in the form of signals which can be electronic, electromagnetic, optical or other signals capable of being received by communications interface 924. These signals 926 are provided to communications interface via a channel 928. This channel 928 carries signals 926 and can be implemented using wire or cable, fiber optics, a phone line, a cellular phone link, an RF link and other communications channels.

In this document, the terms "computer program medium" and "computer usable medium" are used to generally refer to media such as removable storage device 918, a hard disk installed in hard disk drive 912 and signals 926. These computer program products are means for providing software to computer system 900.

Computer programs (also called computer control logic) are stored in main memory 908 and/or secondary memory 910. Computer programs can also be received via communications interface 924. Such computer programs, when executed, enable the computer system 900 to perform the features of the present invention as discussed herein. In particular, the computer programs, when executed, enable the processor 904 to perform the features of the present invention. Accordingly, such computer programs represent controllers of the computer system 900.

In an embodiment where the invention is implemented using software, the software may be stored in a computer program product and loaded into computer system 900 using removable storage drive 914, hard drive 912 or communications interface 924. The control logic (software), when executed by the processor 904, causes the processor 904 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

The present invention is described specifically when implemented within an interface unit, such as interface unit 202, that is connected to servers in a farm for the purpose of offloading connection processing overhead from the servers. However, the present invention can also be applied within other kinds of devices that are in the network connection path between the client and the servers. As network traffic flows through such devices, they all have the opportunity to apply the present invention to offload connection processing. Some examples of such devices are:

Load Balancers which distribute client network connections between a set of servers in a server farm (local or geographically distributed). The invention can readily be combined with the load balancing function.

Bandwidth managers which monitor network traffic and meter packet flow. These devices can also use the present invention.

Firewalls monitor packets and allow only the authorized packets to flow through. The present invention can be used to provide an additional feature within firewalls.

Routers and switches also lie in the path of the network traffic.

The industry trend is to integrate additional functionality (such as load balancing, bandwidth management and firewall functionality) within these devices. Hence, the present invention can easily be incorporated into a router.

The specific integration of the present invention into each one of the above devices is implementation specific.

The present invention can also be applied within computer systems which are the end points of network connections. In this case, add-on cards can be used to implement the invention and thus off load the main processing elements within the computer system.

Conclusion

The previous description of the preferred embodiments is provided to enable any person skilled in the art to make or use the present invention. The various modifications to these embodiments will be readily apparent to those skilled in the art and the generic principles defined herein maybe applied to other embodiments without the use of the inventive faculty. Thus, the present invention is not intended to be limited to the embodiments shown herein but is to be accorded the widest scope consistent with the principles and novel features disclosed herein.

What is claimed:

1. A method for controlling a number of transport layer connections established with a server, the method comprising the steps of:
   (a) intercepting, by a device located between a client and a server, a request from the client to establish a transport layer connection with the server, the device providing a pool of one or more transport layer connections to the server, the pool having at least a first transport layer connection;
   (b) comparing, by the device, the number of transport layer connections established between the device and the server to an identified maximum number of allowable connections to the server, the maximum number of allowable connections to the server identified based on a rate of change of a response time of the server;
   (c) determining, by the device, (i) that a number of transport layer connections established between the device and the server is below a maximum number of allowable connections, responsive to the comparison of the number of transport layer connections established between the device and the server to the identified maximum number of allowable connections to the server, and (ii) that the number of requests the server is responding to within a predetermined amount of time is above a server throughput threshold; and
   (d) opening, by the device, a second transport layer connection for the pool of one or more transport layer connections between the device and the server responsive to the determination.

2. The method of claim 1, wherein step (d) comprises opening, by the device, the second transport layer in response to determining the first transport layer connection to the server is not free for use by the client.

3. The method of claim 1, comprising determining, by the device, the maximum number of allowable connections for the server based on one of a number of pending requests sent to the server, an error message to the server or an overload message from the server.

4. The method of claim 1, comprising, multiplexing, by the device, via the first transport layer connection one or more requests from the client to access information on the server and one or more requests by a second client to access information on the server.

5. The method of claim 1, comprising queuing, by the device, the request in a buffer until one of the first transport layer connection or the second transport layer connection is free for use by the client.

6. The method of claim 1, comprising queuing, by the device, the request from the client in response to determining the number of transport layer connections to the server is one of equal to or greater than the maximum number of allowable connections.

7. The method of claim 6, comprising determining, by the device, a preferred client value for the request of the client, and determining a position of the request in the buffer based on the preferred client value.

8. The method of claim 7, comprising determining, by the device, the preferred client value by one of a network address, a port address, a header or a cookie related to the request of the client.

9. The method of claim 1, comprising closing, by the device, one transport layer connection of the pool of one or more transport layer connections to the server in response to determining the server's performance exceeds a predetermined threshold.

10. A system for controlling a rate of establishing network connections to a server, the system comprising:
   a device located between a client and a server, the device comprising a network interface device and a processor;
   wherein the network interface device is configured for intercepting a request from a client to establish a transport layer connection with a server, the device providing a pool of one or more transport layer connections to the server, the pool having at least a first transport layer connection;
   wherein the processor is configured for:
      comparing the number of transport layer connections established between the device and the server to an identified maximum number of allowable connections to the server, the maximum number of allowable connections to the server identified based on a rate of change of a response time of the server, and
      determining (i) that a number of transport layer connections established with the server is below a maximum number of allowable connections, responsive to the comparison of the number of transport layer connections established between the device and the server to the identified maximum number of allowable connections to the server, and (ii) that the number of requests the server is responding to within a predetermined amount of time is above a server throughput threshold; and
   wherein the network interface device is further configured for opening a second transport layer connection for the pool of one or more transport layer connections to the server responsive to the determination.

11. The system of claim 10, wherein the network interface device is further configured for opening the second transport layer in response to determining the first transport layer connection to the server is not free for use by the client.

12. The system of claim 10, wherein the processor is further configured for determining the maximum number of allowable connections for the server based on one of a number of pending requests sent to the server, an error message to the server or an overload message from the server.

13. The system of claim 10, wherein the network interface device is further configured for multiplexing via the first transport layer connection one or more requests from the client to access information on the server and one or more requests by a second client to access information on the server.

14. The system of claim 10, wherein the network interface device is further configured for queuing the request in a buffer until one of the first transport layer connection or the second transport layer connection is free for use by the client.

15. The system of claim 10, wherein the network interface device is further configured for queuing the request from the client in response to determining the number of transport layer connections to the server is one of equal to or greater than the maximum number of allowable connections.

16. The system of claim 15, wherein the processor is further configured for determining, a preferred client value for the request of the client, and determining a position of the request in the buffer based on the preferred client value.

17. The system of claim 16, wherein the processor is further configured for determining, the preferred client value by one of a network address, a port address, a header or a cookie related to the request of the client.

18. The system of claim 10, wherein the network interface device is further configured for closing one transport layer connection of the pool of one or more transport layer connections to the server in response to determining the server's performance exceeds a predetermined threshold.

* * * * *